July 19, 1960

R. W. PARKER ET AL 2,945,249

LAWN SWEEPING MACHINE

Filed July 12, 1956

INVENTORS
RICHARD W. PARKER
& EDWIN F. OBLINGER
BY

ATTORNEYS

July 19, 1960  R. W. PARKER ET AL  2,945,249
LAWN SWEEPING MACHINE

Filed July 12, 1956  5 Sheets-Sheet 3

INVENTORS
RICHARD W. PARKER
& EDWIN F. OBLINGER
BY
*Schmieding and Fultz*
ATTORNEY

INVENTORS
RICHARD W. PARKER
& EDWIN F. OBLINGER
BY

ATTORNEYS

INVENTORS
RICHARD W. PARKER
& EDWIN F. OBLINGER
BY
ATTORNEYS

2,945,249
LAWN SWEEPING MACHINE

Richard W. Parker and Edwin F. Oblinger, Springfield, Ohio, assignors to The Parker Sweeper Company, Springfield, Ohio, a corporation of Ohio Filed July 12, 1956, Ser. No. 603,855

8 Claims. (Cl. 15—79)

The present invention relates to lawn machines and more particularly to lawn sweeping machines.

Some lawn machines, such as lawn sweepers or lawn mowers, employ debris-receiving baskets or receptacles. Such receptacle usually trails the sweeper or mower. Such basket or receptacle usually includes a sheet metal lower wall or floor and cloth side and rear walls. A basket or receptacle of this type, particularly in a lawn sweeper, is provided with rear wheels or rollers which ride on the ground and support the debris receptacle.

It is desirable to provide for raising or lowering the rotating element of the machine, e.g. it is desirable at times that the outer ends of the brush be disposed close to the surface being worked upon, to-wit, when the lawn sweeper is used to sweep sidewalks or closely cut lawns; at other times the outer ends of the brush should be disposed further from the ground, for example, when leaves are to be collected from lawns having tall grass. Usually, and as is herein disclosed, the frame, which carries the rotating element, namely the brush, is disposed parallel with but spaced from the axis of the wheels of the frame, and, to adjust the height of the brush, the frame is rotated about the axis of the wheels. Such frame includes a hood which is used for directing the debris rearwardly and toward the debris receptacle. In the lawn sweeper art, the brush is usually disposed rearwardly of the axis of the wheels, and the hood is moved relative to the axis of the frame when the frame is rotated about such axis.

Our invention contemplates so sloping the hood so that it directs the debris properly regardless of its adjusted position, i.e., the debris will not be directed over the debris receptacle when the brush is in its highest adjusted position, and the debris will be directed toward and into the receptacle when the brush is in its lowest adjusted position.

Further objects and advantages will be apparent from the following description, reference being had to the accompanying drawings wherein a preferred embodiment of the invention is illustrated.

Figure 1:
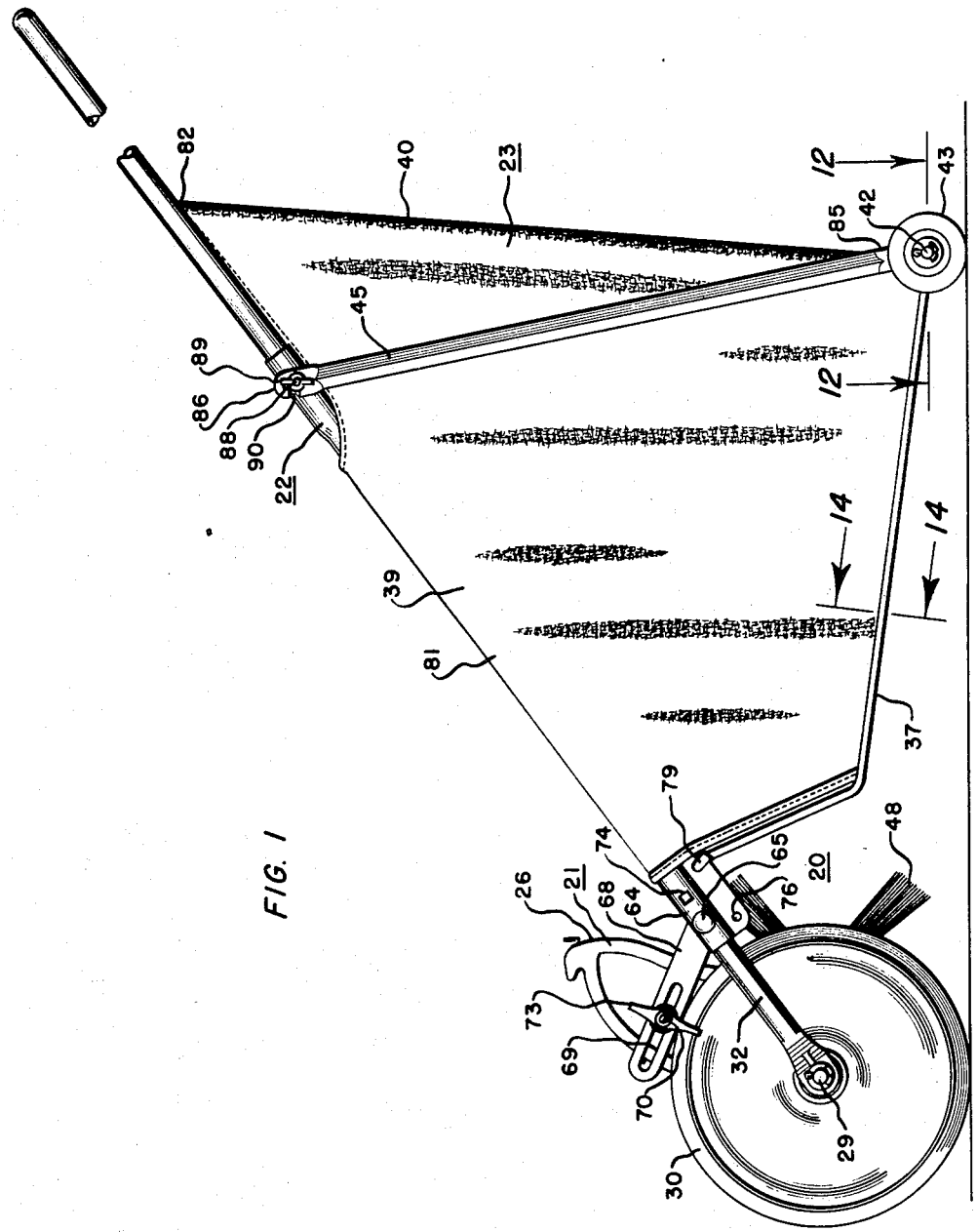
Fig. 1 is a side view of our improved sweeper.
Figure 2:
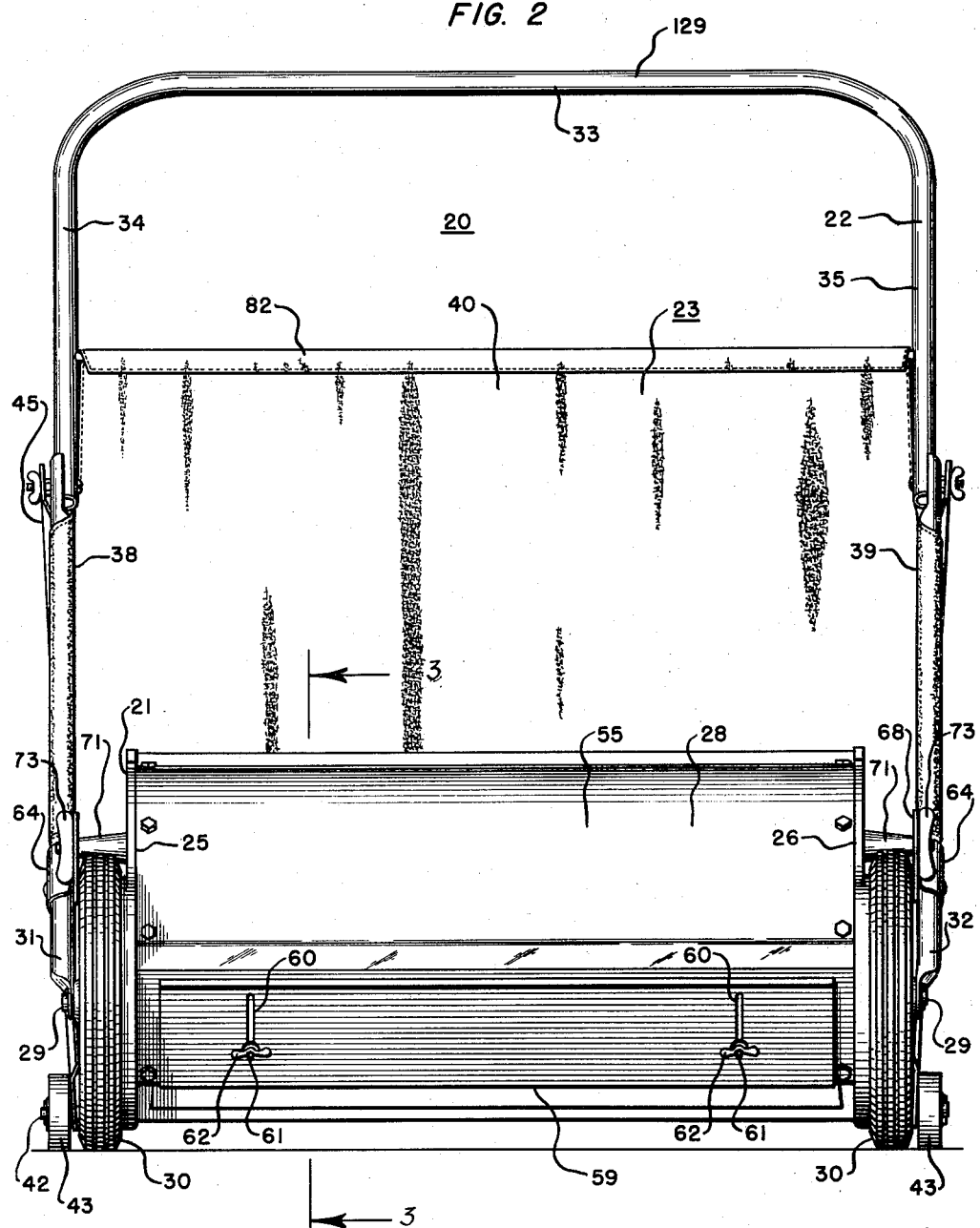
Fig. 2 is a view from the front of the sweeper.

Referring to the drawings, the sweeper 20 comprises a main frame 21, a handle 22 and a debris receptacle 23.

The main frame 21 includes side plates 25 and 26 which are connected with one another by a hood 28. The side plates each carry an axle 29 for supporting wheels 30 on the outside of the side plates.

The handle 22 includes bars 31 and 32 which are formed of tubing, the lower ends of which are connected with the frame 21 at the axles 29. The handle also includes a U-shaped bar in the form of a tube 33, the legs 34 and 35 of which are connected respectively with the upper ends of tubes 31 and 32. The debris receptacle 23 includes a sheet metal bottom wall or floor 37, opposite side walls 38 and 39, and a rear wall 40. These walls 38, 39 and 40 are formed of cloth, such as heavy canvas. The rear of the floor 37 carries an axle 42 and this axle carries wheels or rollers 43 disposed on opposite sides of the receptacle 23. Braces 45 extend from the axle 42 to the handle 22 for holding the handle in upright position.

Figure 3:
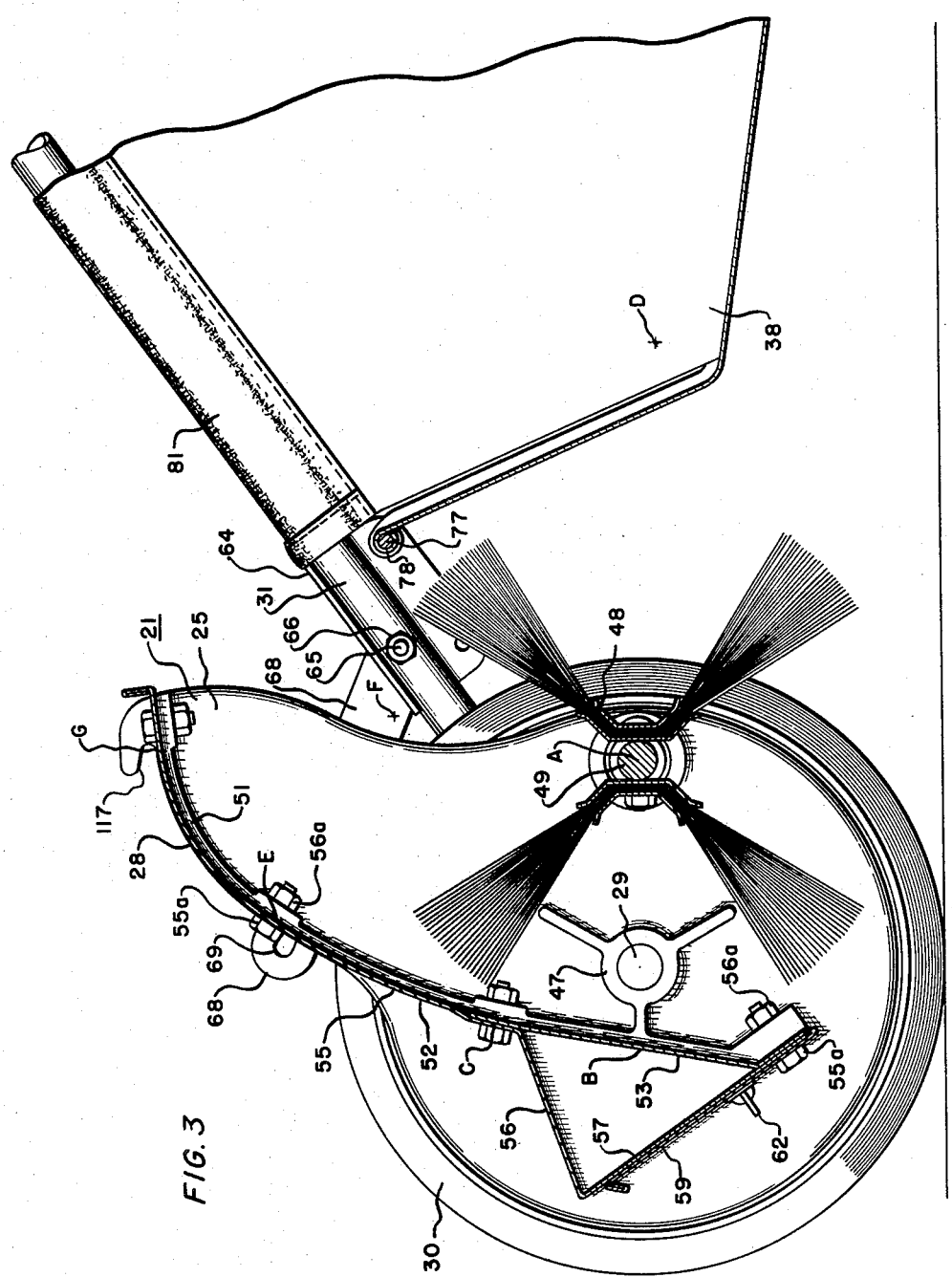
Fig. 3 is a sectional view taken substantially along the line 3—3 of Fig. 2.
Figure 4:
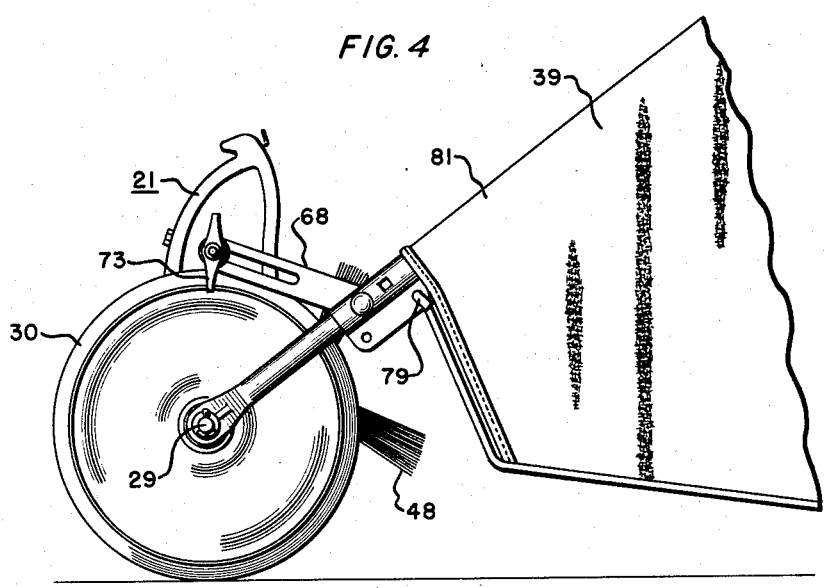
Fig. 4 is a side view of the lower part of the sweeper showing the position of the frame when the brush is in the highest position.
Figure 5:
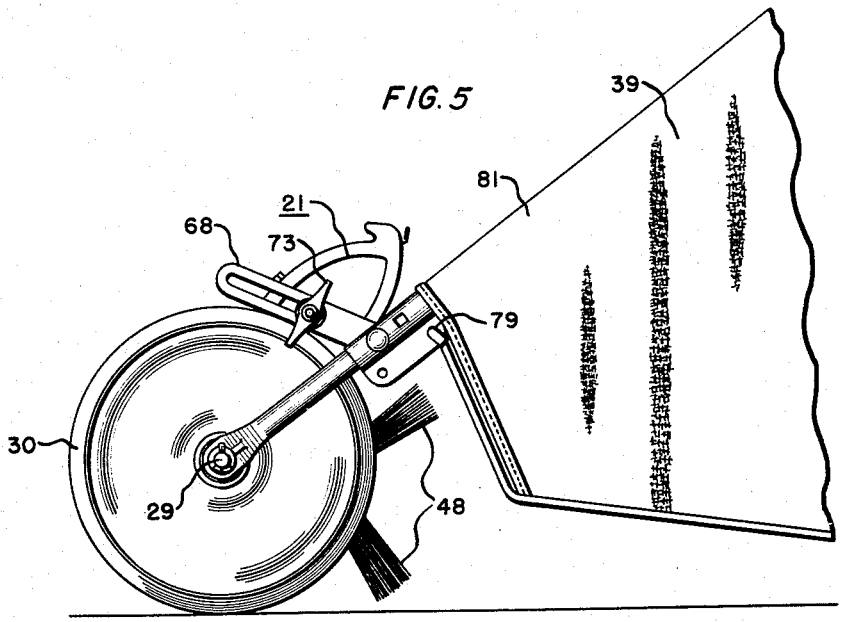
Fig. 5 is a view similar to Fig. 4 showing the brush in its lowermost position.

Referring more in detail to the drawings and particularly to Fig. 3, the side plate 25, and, of course, side plate 26 which is an allochiral of plate 25, is provided with a hub 47 for supporting the axle 29. The wheel 30, on the axle 29, is suitably geared through gearing (not shown, but which may be like that shown in the Parker et al. Patent No. 2,654,106) for driving the rotatable brush 48 through its shaft 49. The gearing is such that as the wheel moves forwardly, as viewed in Fig. 4, that is in a counterclockwise direction, the brush shaft 49 will be rotated in a clockwise direction. It will be understood that the shaft 49 is journaled in suitable bearings in the confronting plates 25 and 26.

The main frame 21, including the side plates 25 and 12, hood 28, axles 29, wheels 30, the brush 48, shaft 49, and this main frame and the gearing between the shaft 49 and wheels comprise the sweeper head.

Each of the plates 25 and 26 is provided with a flange or ledge 51, part of which ledge lies forwardly of the brush 48 and part of which is above said brush. The composite hood, including the sheet metal pieces 52 and 53, lies forwardly of and rests upon the ledge 51 and is held in place by bolts 55a and nuts 56a. The sheet metal 52 of the hood 28 includes an upper section 55, a forwardly and downwardly extending section 56 which merges with a downwardly and rearwardly extending section 57. The sheet metal 53 forms a substantial continuation of section 55 of sheet metal 52 and sheet metal 53 and section 55 defines the inner surface of the hood.

A hood extension 59, in the form of a sheet metal plate, is adjustably secured to the front and underside of section 57 of sheet metal 52. This plate 59 is provided with slots 60. Bolts 61, which are suitably secured to the section 57, extend through these slots and cooperate with wing nuts 62 for tightening the extension plate 59 in adjusted position. As will be more clearly defined hereinafter, the brush 48 can be raised and lowered. When the brush is lowered, it is desirable that the extension plate 59 also be lowered; otherwise the brush, in moving clockwise, would push dirt forwardly beneath the hood instead of upwardly through the hood. The section 57 and consequently the hood extension 59 is always at such angle that debris, such as leaves, is accumulated forwardly of the extension 59, pressed downwardly and thus the extension constantly tends to feed the debris into the machine below the extension.

Each of the bars 31 and 32 of the handle 22 has a bracket 64 secured thereto by stove bolts 65 and nuts 66. Bolts 65 are also used to support the lower end of a link 68. Each of these links extends upwardly and forwardly, and is provided with a longitudinally extending slot 69 for receiving a bolt 70. Bolts 70 are secured to bosses 71 formed integrally with and extending from the sides of plates 25 and 26. Wing nuts 73 are threaded to receive the bolts 70. To adjust the height of the brush shaft 49, wing nuts 73 are loosened and then the rear end of the main frame, including side plates 25 and 26 and hood 28 are rotated about the axles 29 of the wheels, is raised or lowered, as desired, and then the nuts 73 are tightened to clamp the main frame to the links 68. The stove bolts 65 are provided with square shanks adjacent the heads thereof and these square shanks are received and held against turning by square holes 74 in the brackets 64.

Brackets 64 are also utilized for supporting the front end of the debris receptacle 23. These brackets are each provided with a hole 76, and these holes receive a rod 77. The forward end of the floor or bottom 37 of the debris receptacle 23 is wrapped around the rod 77, as at 78, to thus support the front end of the receptacle. The outer ends of rod 77 are bent, as at 79, to prevent accidental withdrawal of the rod from holes 76.

Each bracket 64 is provided with two square holes 74 and two holes 76 for rod 77, but only one of the square holes 74 and one of the holes 76 of each bracket is used. However, by providing the holes as shown, one form of bracket can be used on either side of the sweeper.

The bottom edges of side walls 38 and 39 and rear wall 40 of the debris receptacle are suitably secured to the metal bottom wall or floor 37 of the receptacle. The upper edges of side walls 38 and 39 are provided with hems 81 for receiving handle bars 31 and 32, respectively. The upper edge of back 40 is also provided with a hem 82 for receiving a rod 83. The opposite ends of this rod 83 extend into and are supported by the legs 34 and 35 of the U-shaped upper handle bar 33. Thus, when the braces 45 are in position, as shown in Fig. 1, the handle 22 holds the debris receptacle in operative position.

As seen from Fig. 1, the lower end 85 of braces 45 are pivotally supported on the axle 42 of the debris receptacle 22. The upper ends 86 of braces 45 are detachably secured to the handle 22 through bolts 88 and wing nuts 89, bolts 88 also being utilized for fastening the upper U-shaped handle bar 33 with the lower handle bars 31 and 32. By detaching the braces 45 from the handle bars, the basket or debris receptacle can be collapsed without removing the receptacle from the handle; by providing for such collapsing, less space is required for storing the machine. The openings 90 in the upper end of braces 45 are in the form of open slots whereby the braces can be removed from the bolts by merely loosening the wing nuts, i.e., the wing nuts or bolts need not be removed.

Figure 6:
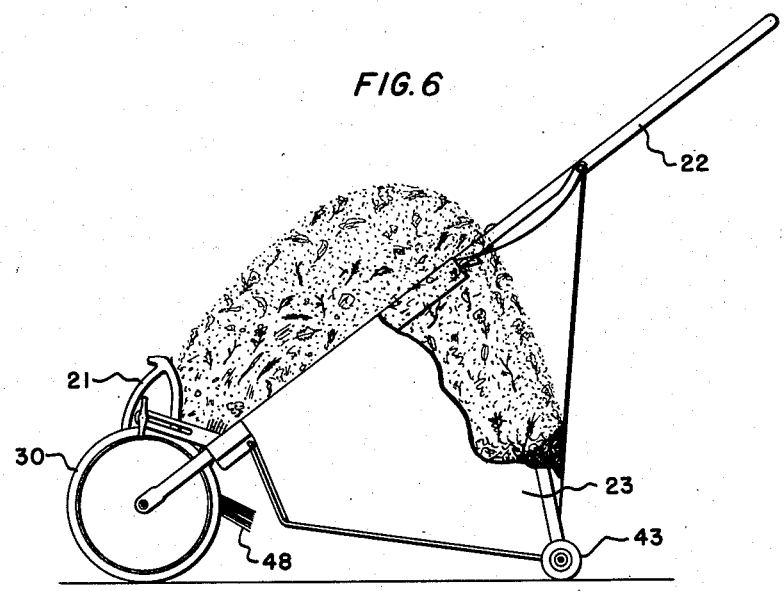
Fig. 6 is a diagrammatic view showing substantially the direction of flow of debris when the brush is in the highest position.
Figure 7:
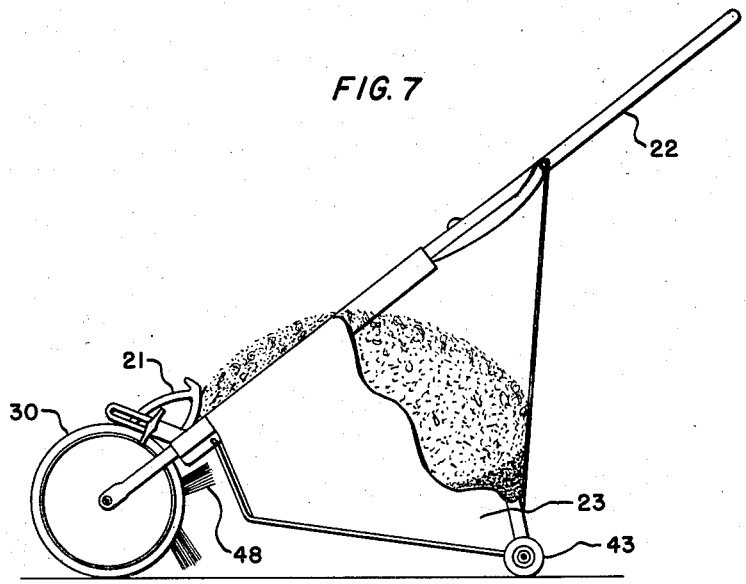
Fig. 7 is a view similar to Fig. 6 but showing the direction of flow of debris when the brush is in the lowermost position.

Referring now to Figs. 6 and 7, wherein the main frame is shown in both of its extreme positions, it will be noted that the hood is so shaped that, although the brush is in its highest position, the trajectory is such that no part of the debris will overshoot the debris receptacle; it will also be noted that the hood is also so shaped that, although the brush is in its lowest position, the trajectory is such that no part of the debris will undershoot the lower end of the debris receptacle. This feature of the invention is attributed to the peculiar shape of the hood, in longitudinal cross-section, such cross-section being shown particularly in Figs. 3, 6, and 7.

Since the contour of the hood's longitudinal cross-section is important, it is deemed that the exact dimensions thereof should be specifically set forth, and, since the mechanical drawings for the construction of the side plates 25 and 26 defined the curvature of the ledge 51 for the hood 28 with the axes of the axles 29 and shaft 49 in the same horizontal plane, and, inasmuch as this frame of reference is within the comprehended positions of the hood, such frame of reference will be used to define the curvature of ledge 51 and, consequently, the curvature of the under side of the hood 28.

The distance between the axis A of shaft 49 and the front edge B of ledge 51, where the ledge intersects the horizontal plane of the shaft 49, is 4⅝ inches; the vertically extending ledge, above said horizontal plane, angles rearwardly-upwardly for 2⅜ inches to C, at an angle of 10 degrees, i.e., a distance of approximately 51% of the distance between the axis of the shaft 49 and the point B where the front edge of the ledge intersects the horizontal plane of the axis of the shaft 49. From C, aforesaid, the front surface of said ledge is in the form of an arc whose radius is 11 5/16 inches in length and whose center D is disposed 11/32 of an inch below said horizontal axial plane of shaft 49, i.e., the radius of 11 5/16 inches equals a distance of approximately 245% of the distance between the axis A and the point B, the vertical distance from the center D of the arc to the aforesaid horizontal plane being approximately .075% of the distance between the axis A and point B; said arc continues upwardly and rearwardly to the point E which lies six inches above said horizontal plane, i.e., the arc spans a distance of 78% of the length between points A and B; this arc then merges with an arc having a radius of 3 15/16 inches, i.e., approximately 85% of the length of the distance between A and B, said arc being struck from the point F, which point F lies four inches above said horizontal plane, i.e., a distance equal to 84% of the distance between points A and B, and lies rearwardly ¾ of an inch of a vertical plane intersecting point A, i.e., 16% of the distance between points A and B. Said second arc continues to point G which lies slightly rearwardly of said vertical plane, intersecting the axis A, i.e., said point G is disposed, vertically above A, a distance equal to 173% of the length of the distance between points A and B; and from G, the hood extends rearwardly and upwardly at an angle of approximately 7 degrees of horizontal.

While the form of embodiment herein shown and described constitutes a preferred form, it is to be understood that other forms may be adopted falling within the scope of the claims that follow:

We claim:

1. A lawn sweeper comprising, in combination, a main frame including side plates and means including a hood bridging the side plates; supporting wheels journaled in said side plates, the rotational axis of the wheels being in transverse relationship to said plates; a rotatable, cylindrical brush having its axis of rotation arranged parallel to the axis of the wheels; a rearwardly and upwardly extending handle for manipulating the sweeper, said handle having the lower end thereof connected with the main frame; means for adjustably securing the handle and frame together, at least one of said handle and frame having means for changing the relative vertical distance between the ground level and the axis of the brush including a position in which the axis of the brush is in the same horizontal plane as the axis of the wheels upon adjustment of the handle with respect to the frame, the hood in vertical cross-section at right angles normal to the axis of the wheels being in the form of a plurality of segments beginning at the lower outermost portion in a substantially planar segment and gradually increasing in a series of segmented arch thereafter, each arc having a radius less than the preceding one and terminating in an outermost upper portion that is substantially planar.

2. A lawn sweeper in accordance with claim 1 in which the side plates thereof are two confronting side plates, allochiral with respect to one another, each plate having an inwardly extending ledge, said hood being attached along each side edge to each respective ledge, and a shaft for the brush, said shaft having its opposite ends journaled in said side plates, said hood and shaft forming the sole interconnecting support between said side plates.

3. A lawn machine in accordance with claim 1 in which the side plates are two confronting side plates, allochiral with respect to one another, each plate being of a substantially circular configuration and including an upwardly extending portion lying substantially rearwardly of a plane extending vertically through the center of said side plates, said plates each including a ledge means having portions extending forwardly of said plane and portions lying adjacent the forward edge of the upwardly extending portions of said plates, an outwardly extending axle carried by one of the side plates at the center thereof; an outwardly extending axle carried by the other side plate at the center thereof; a wheel for each axle, said two wheels forming the sole support for the front end of the sweeper; said hood being attached to said ledges and a shaft for a brush having its opposite ends journaled in the side plates adjacent the rear edges of the plates thereof; said hood and shaft forming the sole interconnecting support between the side plates.

4. A sweeper in accordance with claim 2 wherein the hood includes a vertically disposed extension and means for securing said extension in a vertically adjusted position on the lower front portion of the hood.

5. A sweeper in accordance with claim 3 wherein the hood includes a vertically disposed extension and means for securing said extension in a vertically adjusted position on the lower front portion of the hood.

6. A sweeper in accordance with claim 1 wherein the hood includes a vertically disposed extension and means for securing said extension in a vertically adjusted position on the lower front portion of the hood.

7. A lawn sweeper comprising, in combination, a main frame including two confronting side plates, allochiral with respect to one another, each plate having an inwardly extending ledge and a hood attached along each side edge to each respective ledge, supporting wheels on opposite sides of the main frame, a shaft for a brush having its opposite ends journaled in the side plates, a rotatable brush mounted on said shaft, said shaft having its axis arranged parallelly of the axis of the wheels, said hood and shaft forming the sole interconnecting support between the side plates, said hood having at its lower front end a downwardly extending inwardly angled flange plate and a reinforcing member including a front face portion secured to said angled portion of said hood and extending upwardly and outwardly therefrom in alignment therewith and a top portion integrally secured to the forward free end of said front portion and extending inwardly and secured to the outside face of said hood below the midpoint thereof whereby said reinforcing member provides additional strength to said hood and enables the proper presentment of debris to be collected to said brush, and a rearwardly and upwardly extending handle for manipulating the sweeper, said handle having the lower end thereof connected with the main frame.

8. A lawn sweeper comprising, in combination, a main frame including two confronting side plates, allochiral with respect to one another, each plate having an inwardly extending ledge and a hood attached along each side edge to each respective ledge and lying forwardly of said man frame and in substantially vertical relation thereto, supporting wheels on opposite sides of the main frame, a shaft for a brush having its opposite ends journaled in the side plates, a rotatable brush mounted on said shaft, said shaft having its axis arranged parallelly of the axis of the wheels, said hood and shaft forming the sole interconnecting support between the side plates, said hood having at its lower end below the midpoint thereof a reinforcing portion including a downwardly and forwardly extending section and a downwardly and rearwardly extending section, the lower end of said first mentioned section merging with the upper end of said second mentioned section, whereby said reinforcing portion provides additional strength to the main frame between the confronting side plates and said second section enables the proper presentment of debris to be collected to said brush, and a rearwardly and upwardly extending handle for manipulating the sweeper, said handle having the lower end thereof connected with the main frame.

References Cited in the file of this patent

UNITED STATES PATENTS

| | | |
|---|---|---|
| 473,438 | Raymond | Apr. 19, 1892 |
| 498,039 | Werner | May 23, 1893 |
| 815,242 | Wildermuth | Mar. 13, 1906 |
| 872,409 | Eldred | Dec. 3, 1907 |
| 995,231 | Eberle | June 11, 1911 |
| 2,092,230 | Thomas | Sept. 3, 1937 |
| 2,654,106 | Parker | Oct. 6, 1953 |
| 2,700,783 | Parker et al. | Feb. 1, 1955 |
| 2,722,709 | Yerkes | Nov. 8, 1955 |
| 2,727,264 | Dunham | Dec. 20, 1955 |